7409X
D. BAIN.
Chimney Cowl.
Patented Feb. 5, 1833.
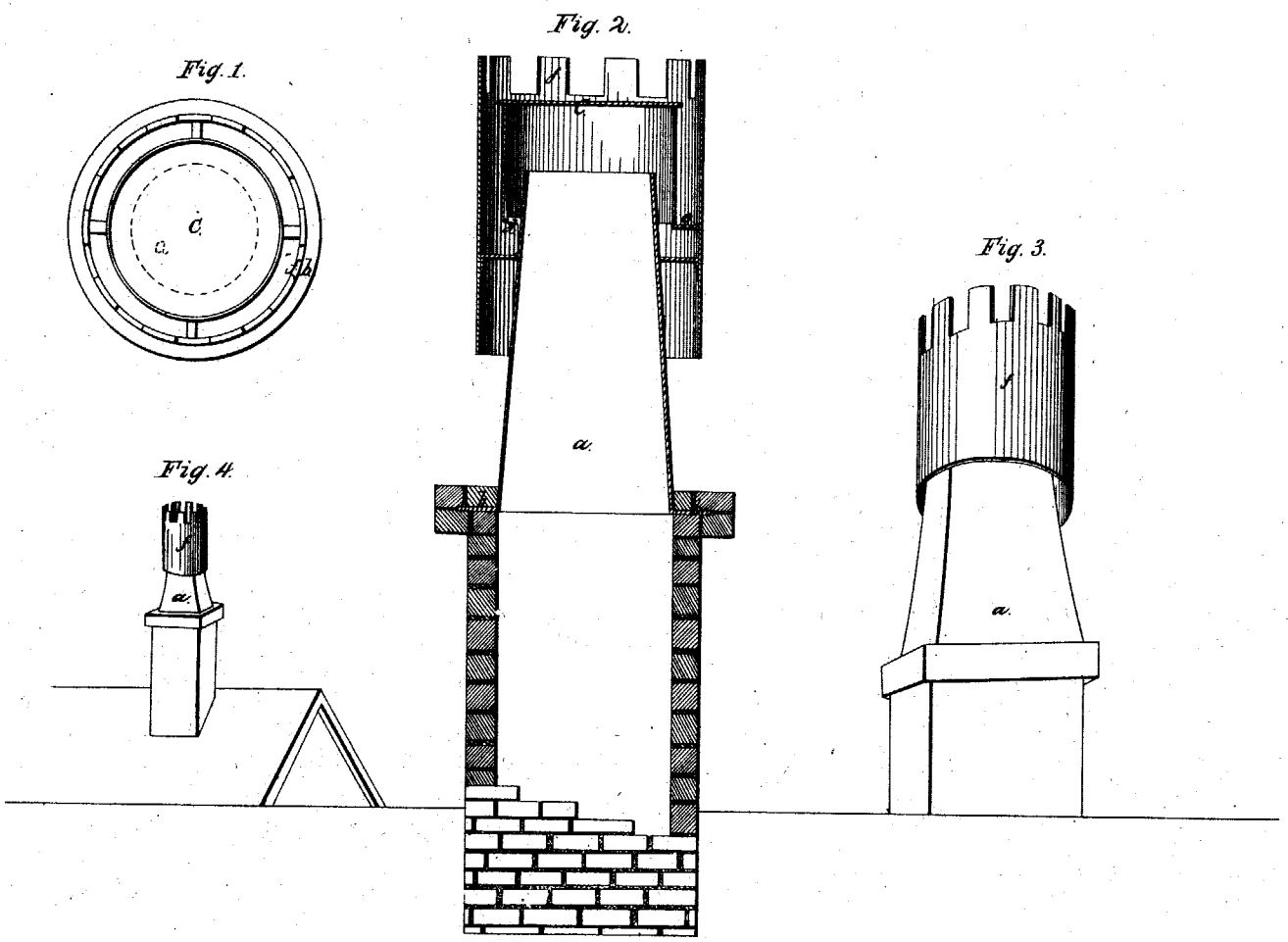
THE NORRIS PETERS CO., PHOTO-LITHO., WASHINGTON, D. C.

7409 X

Feb 5. 1833

David Bain of the City and County of Baltimore State of Maryland

The Schedule referred to in these Letters Patent, and making part of the same, containing a description in the words of the said David Bain himself of his improvement, being an Apparatus to cure smoky chimneys

---

Be it known that I David Bain of the City and County of Baltimore and State Maryland, have made an improvement in the useful Arts. being an apparatus to cure smokey chimneys which is described as follows.

This Apparatus consists of a tube placed on the top of the chimney over the flue, a cap supported at some distance above the top of the tube to prevent the wind blowing down the chimney, - and an outward casing to admit the smoke to descend and pass out of the side or to ascend and escape at the top. The Tube is made of sheet iron, copper or any suitable material. and of any size, shape or figure adapted to the chimney ..... It is secured to it by flanges or in any other suitable way...... The cap is also made of sheet iron, copper, or any other suitable material. and of any size. shape, or figure, adapted to the tube; it is larger than the tube, and less than the outer casing, supported by projections or flanges on the inside of the outer casing. at a proper distance above the tube, & is made movable on a hinge or otherwise to admit the sweeps. The outer casing. is made of any suitable material and encloses the cap and tube, leaving a space between them sufficient to allow the smoke to pass ..... It has notches or openings at the top - for breaking off the wind ... It is supported by projections from the top of the tube ... When the wind blows high the smoke passes up the tube from the chimney, strikes the cap. and descends between the casing and the tube. when the wind is moderate it ascends between the cap and casing. the notches on the top of the casing serve to break off the wind and [illegible] it more regular.

The invention here claimed and desired to be secured by Letters Patent is, the before described Apparatus for curing smoky Chimneys. but particularly the cap and outward casing ...

For a further illustration of my invention I refer to the model and drawing of the

7409X the same deposited in the Patent Office ..... In testimony whereof I have hereunto signed my name before two witnesses this 31st day of January 1833.

Witnesses

Geo. Wm. P. Elliot,
Wm. J. French

David Pain.

(434)

Patented 5th February 1833.